United States Patent [19]
Koivunen

[11] Patent Number: 5,281,190
[45] Date of Patent: Jan. 25, 1994

[54] GEAR THRUST CONTROLLED MULTI-MODE CLUTCH FOR POWER TRANSMISSIONS

[76] Inventor: Erkki Koivunen, 18260 Blue Heron Pointe Dr., Northville, Mich. 48167

[21] Appl. No.: 928,891

[22] Filed: Aug. 12, 1992

[51] Int. Cl.[5] ............................................. F16H 37/00
[52] U.S. Cl. ............................... 475/116; 192/85 AA; 192/101; 192/20; 192/54; 475/125; 74/325; 74/333; 74/337
[58] Field of Search ................. 192/85 AA, 20, 101, 192/3.52, 54; 475/116, 125, 146, 311, 344; 74/337, 333, 325

[56] References Cited

U.S. PATENT DOCUMENTS

| | | | |
|---|---|---|---|
| 2,882,757 | 5/1959 | Edsall | 475/125 X |
| 3,101,012 | 8/1963 | Christenson et al. | 475/125 X |
| 3,191,732 | 6/1965 | McDowall | 192/54 X |
| 3,971,260 | 7/1976 | Hobbs | 475/125 X |
| 4,162,713 | 7/1979 | Heitman et al. | 192/3.52 X |
| 4,909,364 | 3/1990 | Grimm | 192/54 X |
| 5,031,746 | 7/1991 | Koivunen | 192/85 AA |
| 5,106,348 | 4/1992 | Koivunen | 475/126 |

Primary Examiner—Leslie A. Braun
Assistant Examiner—Daniel Wittels
Attorney, Agent, or Firm—Charles R. White

[57] ABSTRACT

Multi-mode friction clutch having a plurality of interleaved clutch plates operable for establishing gear ratios in planetary and countershaft type automatic transmissions and operative to provide smooth and self-synchronized shifting without the use of one-way roller or sprag clutches. Gear thrust forces from associated helical gearing and opposing hydraulic pressure forces are used to regulate the hydraulic pressure of a piston chamber by shifting an annular control sleeve which controls fluid exhaust from the chamber to maintain a direct relationship between the torque capacity of the clutch and the variable torque it actually carries. Consequently, the clutch is automatically released when the transmitted torque diminishes to zero or reverses. The clutch is applied in a normal lock mode for predetermined gear ratios, set in one-way mode for shifting and totally released when the shift is completed. The multi-mode clutch is applicable to a chain driven multi-axis countershaft transmission construction, which further foreshortens the transmission for improved utilization of the space allocated for vehicle powertrains.

19 Claims, 4 Drawing Sheets

GEAR THRUST CONTROLLED MULTI-MODE CLUTCH FOR POWER TRANSMISSIONS

SUMMARY OF THE INVENTION

This invention provides a simple and reliable multiple plate type clutching device used as clutches or brakes for establishing gear ratios for a hydraulically controlled automatic transmission, which allows smooth, self-timed freewheeler type shifts without the cost and space demands of such freewheelers.

In this invention, the term "clutch" applies to and means friction devices, such as: 1friction brakes, wherein stationary friction means is frictionally engaged to rotatable friction means to slow down or hold the rotatable friction means stationary, and, 2) friction clutches, wherein relatively rotatable friction means are frictionally engaged so that they are drivingly connected for rotation and torque transmittal.

The invention utilizes axial gear forces, sensitive to the magnitude and direction of the torque transmitted by the associated helical gearing of the transmission, to control the torque capacity of the clutch. Specifically, the clutch is automatically released when the transmitted torque diminishes to zero or is reversed for obtaining smooth power upshifting. The clutch also engages automatically at the right moment for a smooth power downshift to a lower gear in a manner of a one-way clutch.

The construction of a gear thrust controlled clutch is very simple. In addition to the elements in a conventional multi-plate clutch, this invention includes an annular sleeve whose function is to control the pressure acting on the clutch apply piston. One end of this axially slidable control sleeve is subjected to the gear thrust and the opposite end to the piston chamber pressure fed through a feed orifice.

If the pressure in the piston chamber produces a force that exceeds the gear thrust force, the control sleeve will slide axially to progressively uncover an exhaust port until equilibrium of opposing forces on the sleeve is reached. In an opposite situation where gear thrust force exceeds the force of pressure in the piston chamber, the control sleeve will be displaced by the thrust forces of helical gearing to a position where the exhaust port flow is more restricted or completely stopped resulting in a rise in chamber until the forces acting on the control sleeve are again in equilibrium.

The pressure acting on the clutch plates through its piston and the corresponding torque capacity of the clutch are therefore always in a linear relationship to the torque transmitted by the clutch and by the associated gearing. Furthermore, if the transmitted torque diminishes to zero or if its direction is reversed, the piston chamber pressure reduces to zero and the clutch will disengage to effect an automatic and smooth ratio change.

The multi-mode clutch has three distinct operating modes. The clutch is applied in a lock mode and it remains there until the transmission is upshifted. In the lock mode the clutch functions like a conventional multiple plate clutch. For upshifting between predetermined ratios the clutch is set in a one-way mode until it releases automatically at torque reversal for a release mode of operation. The slight friction plate drag that remains is totally eliminated when the clutch is set in the release mode any time after the shift is completed.

In addition to conventional planetary gear automatic transmissions, the gear thrust controlled multi-mode clutch is particularly well suited for countershaft type transmissions for its simplicity and compactness. Before this invention, transmission of this type designed with conventional technology required two rotating multi-plate clutches and one roller or sprag clutch for each gear ratio, if engine braking is required for each gear. The gear thrust controlled multi-mode clutch construction of this invention eliminates the requirement for one such rotating clutches and the roller or sprag clutch while solving excessive package length problems associated with most front wheel drive passenger vehicles with transverse powertrains. With the multi-mode clutches of this invention, transmissions package length is reduced to a point where additional gear ratios can be added and still be readily used in a wide range of front wheel drive vehicles including those having small compartments for the power package.

DETAILED DESCRIPTION OF THE DRAWINGS

Figure 1:
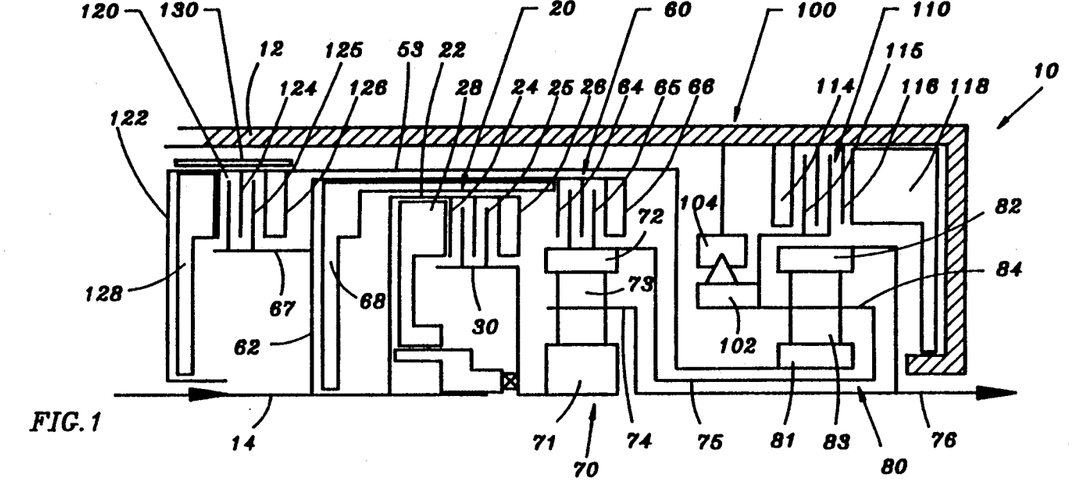
FIG. 1 is a schematic diagram of an automatic change speed transmission.

Turning now in greater detail to the drawings, there is diagrammatically shown in FIG. 1 the upper half of a four-speed automatic transmission 10 for a wheeled vehicle incorporating a gear thrust actuated multi-mode clutch 20 of this invention as a forward clutch. The transmission has a conventional outer casing 12 disposed around the transmission gearing, the multi-mode clutch 20, as well as other gear controlling friction devices and additional components including a transmission input shaft 14 driven by a power source such as a vehicle internal combustion engine through a torque converter or fluid coupling, not shown. This input shaft is drivingly connected to a third/fourth input drum 62, which encompasses the multi-mode clutch and provides a housing for a third/fourth clutch 60. The input shaft 14 is also drivingly connected to a forward clutch input drum 22 providing a housing for the multi-mode forward clutch 20 illustrative of one of the preferred embodiments of this invention.

More particularly, friction plates 24 of the gear thrust actuated multi-mode forward clutch 20 are splined by tangs formed o their outside diameters to the axially extending cylindrical shell of the forward clutch drum 22. These friction plates are interleaved with annular friction plates 25 which are splined at their inner diameters to the outer cylindrical wall of a cylindrical hub 30 that is drivingly connected with a sun gear 71 of a planetary input gear set 70. The friction plates of the forward clutch 20 are backed up by reaction plate 26 and the sun gear 71 is driven by the input shaft 14 when the friction plates of the forward clutch are drivingly engaged by apply pressure exerted through an annular piston 28 housed within drum 22.

Friction plates 64 of a third/fourth clutch 60 are splined similarly to the cylindrical shell of the input drum 62 and are interleaved with annular friction plates 65 that are splined at their inner diameters to the peripheral surface of a ring gear 72 of the input gear set 70. This clutch is selectively engaged by piston 68, which is slidably disposed in the input drum 62 which has a cylindrical wall that extends over the input clutch 20. The friction plates are backed up by reaction plate 66 fixed to the extending end of input drum 62.

The input gear set 70 has a plurality of planet gears. 73 mounted on a carrier 74 drivingly connected to the transmission output shaft 76 meshing with the sun gear 71 and the ring gear 72. Ring gear 72 is attached to the flange of a centralized shaft 75, which is drivingly connected with a planetary gear carrier 84 of a reaction gear set 80. The output shaft 76 drives the drive wheels of the vehicle through a final drive such as differential gearing.

The gears of the input gear set 70 and reaction gear set 80 have meshing helical gear teeth which produce end thrust forces when under load. The thrust load of gear set 70 is advantageously employed to effect smooth and well timed 3–4 upshift and 4–3 downshifts, as will be later described.

When engaged in the normal lock mode, the multi-mode clutch 20 functions as a conventional clutch and is driven by the transmission input shaft 14 to transmit engine torque to the sun gear 71 of the input gear set 70.

A sun gear 81 of the reaction gear set 80 is attached to a drum 53, which extends rearward surrounding the input multi-mode clutch 20, the third/fourth clutch 60 and input gear set 70. The drum 53 is in turn in driving connection with a reverse clutch housing 122. A ring gear 82 of the reaction gear set 80 is connected to the transmission output shaft 76. The sun gear 81 drivingly meshes with planet gears 83, mounted on carrier 84, that in turn mesh with an associated ring gear 82.

A one-way clutch 102 provides the ground for the planet carrier 84 of input gear set 70 in first range drive and releases it automatically on torque reversal on a shift to the second range on application of a friction band 130 on drum 53 to hold sun gear 81 for reaction. The inner race 102 of the one-way clutch 102 is attached to the carrier 84 and its outer race 104 to a bulkhead fixed to the transmission casing 12.

Reverse range is obtained by driving the sun gear 81 and holding the planet carrier 84 thereby causing the ring gear 82, which is drivingly attached to the output shaft 76, to turn in a reverse drive direction. Planet carrier 84 is grounded to the transmission casing 12 by engaging a multiple plate clutch 110 having interleaved friction plates 115 and 116 selectively engaged by hydraulic piston 118 and a backing plate 114. When applied while the transmission is first gear, the clutch 110 will provide overrun braking by holding the ring gear 72 of gear set 70 stationary.

The drive from the engine to the sun gear 81 for reverse is established by engaging reverse clutch 120 by a piston 128. Friction plates 124 are splined by tangs on their outer periphery to the forward extending drum portion of reverse clutch housing 122 connected to drum 53. These plates are interleaved with faced friction plates 125 which are splined at their inner diameters to the cylindrical hub 67 attached to the input drum 62.

The clutch is backed up by reaction plate 126 secured to the interior of the forward extending portion of the reverse clutch housing.

The drum 53 is encircled by a friction element here provided by a brake band 130, which is selectively applied in second and fourth gear to hold sun gear 81 of reaction gear set 80 from rotating.

Figure 1A:
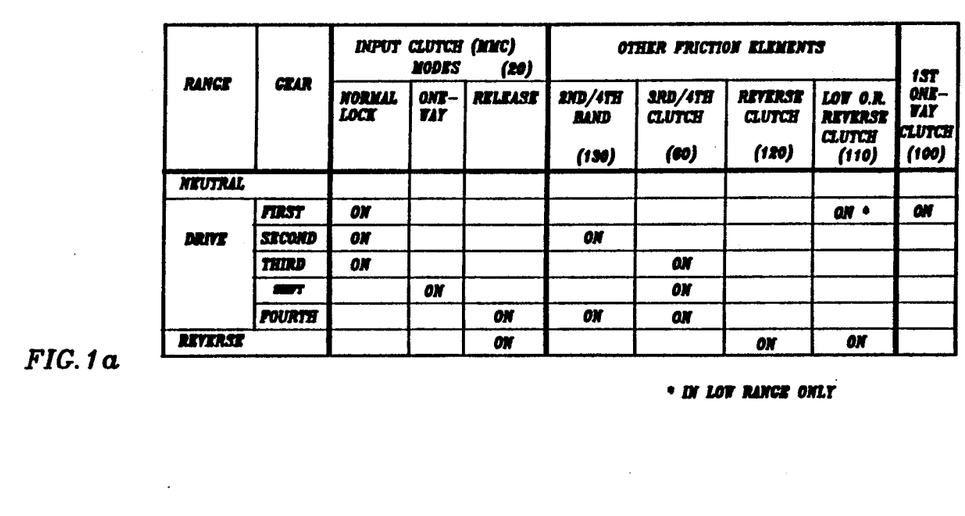
FIG. 1a is a chart keying the operation of the transmission of FIG. 1 to the application and release of various clutches illustrated in FIG. 1.

FIG. 1a is a chart identifying the various drive ranges and showing the operational modes of the multi-mode input clutch 20 in conjunction with the selective engagement of the other friction elements 60, 100, 110, 120 and 130 to produce the four forward spaced ratios as well as the reverse ratio.

Figure 2:
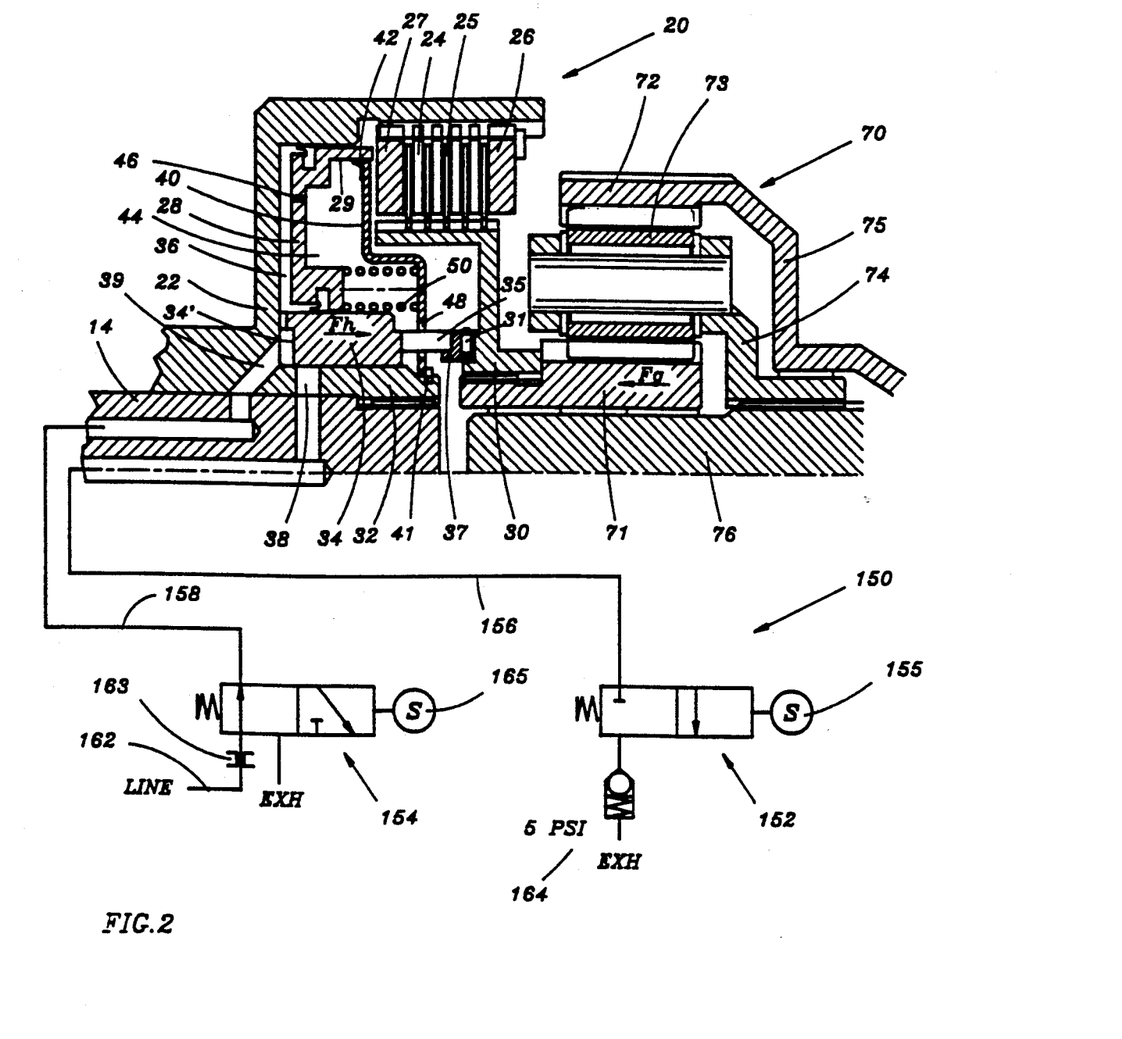
FIG. 2 is a sectional view of a portion of the transmission of FIG. 1 with control valves diagrammatically illustrated.

FIG. 2 illustrates in greater detail one preferred embodiment of the gear thrust actuated multi-mode clutch 20 of this invention. As shown, the friction plates 24 are splined to the forward clutch drum 22 and are interleaved with clutch plates 25 splined to the outer peripheral wall of clutch hub 30. The center annular collar of hub 30 is splined or otherwise securely attached to the sun gear 71 of the input gear set 70. Clutch 20 is selectively engaged through an apply plate 27 by apply piston 28 which is slidably disposed in the clutch housing 22. A backing or reaction plate 26, fixed to the clutch housing, provides a reaction surface against the apply force of apply piston 28.

The input clutch housing 22 also houses a control sleeve 34 mounted slidably over the inner hub portion 32 and inside the piston 28. A plurality of projection 35 formed on the front end of the sleeve 34 extend through the openings 48 pierced in the balance piston 40 to abut the clutch hub 30 through an interdisposed washer 37 and needle thrust bearing 31. The rearward annular end 34' of this sleeve provides an area surface that is acted upon by pressure fed to chamber 36 to provide a force tending to shift the control sleeve to the right in FIG. 2. As will be explained, the function of the sleeve 34 is to control the outflow of pressure fluid through an exhaust port 38 from a clutch control fluid pressure chamber 36 formed by apply piston 28, control sleeve 34 and the input clutch housing 22.

The annular balance piston 40 is mounted on a smaller diameter portion of the clutch inner hub 32 and is retained thereto by a snap ring 41. The balance piston has on its periphery a molded-in lip seal 42 which slidingly engages with an inner diameter 29 in the piston 28. The balance piston 40 and the apply piston 28 form a chamber 44 which is kept filled with oil by bleeding through an orifice 46 in the wall portion of piston 28. Any excess oil is allowed to overflow through openings 48 in the balance piston 40. Compression springs 50 are disposed between piston 28 and balance piston 40 to hold the piston 28 in a retracted position when the clutch is released.

Generally, the purpose of a balance piston is to keep the centrifugal pressure of oil present in piston chamber from unintentionally applying a disengaged clutch. It is obviously not needed in stationary applications where the multi-mode clutch is used as a brake.

A basic electro-hydraulic control system is partially shown at 150 in FIG. 2 for the gear thrust biased multi-mode clutch of this invention so that it can be readily understood, however, other control systems can be designed for the multi-mode clutch utilizing the disclosure of this specification and drawings.

In first, second and third gear drive, the pressurized oil is supplied to the passage 162 leading through an orifice 163 to a feed control valve 154. In the normal lock mode and in the one-way mode, solenoid 165 is de-energized to shift the spring biased two-way valve element so that it admits oil to the passage 158 leading to the feed port 39 and further to the piston chamber 36.

An exhaust control valve 152, which is also a two-way valve operated by solenoid 155, normally blocks the flow from the exhaust port 38 through the connecting line 156.

When the exhaust and feed control valves 152 and 154, respectively, are positioned for a lock mode, as described in the preceding, the clutch 20 is applied as any conventional clutch. The torque transmitted through the clutch 20 to the gear set 70 will produce, due to its helical gear tooth form, an axial force "$F_g$" which will push the sun gear 71, along with the clutch hub 30 attached thereto, toward the control sleeve 34. In this mode, the force of fluid pressure "$F_n$" acting on the opposite end 34' of the control sleeve 34 may or may not be sufficient to prevent it from bottoming against the clutch housing 22. This is inconsequential since the exhaust is already blocked at the exhaust 164 of exhaust control valve 152.

The input multi-mode clutch 20 will stay in the normal lock mode in the first, second and third gear ranges, in both drive and coast vehicle operation.

When the vehicle reaches the scheduled 3–4 upshift point, the clutch is immediately set in a one-way mode. In this mode the clutch will stay applied in drive, but will release when the direction of torque is reversed, as normally occurs during a power upshift. This one-way mode is established by shifting the exhaust control valve 152 to the exhaust position by energizing its solenoid 155. With the valve in a shifted exhaust position, the exhaust port 38 and the passage 156 are connected with a spring biased ball regulating valve 164 set to maintain a low, minimum pressure in the piston chamber 36, 5 psi, for example. The presence of this "tickling" pressure assures that the clutch will re-apply after being released, as would happen if vehicle starts coasting.

In the one-way mode during a 3–4 upshift, as the torque transmitted by the clutch 20 and the gear set 70 decreases, the thrust force by which the sun gear 71 pushes the control sleeve 34 also decreases. When the hydraulic force acting on the control sleeve exceeds the gear derived force on the opposite end, the sleeve will slide forward uncovering the exhaust port 38. This causes the piston chamber 36 to be exhausted lowering the pressure therein until the hydraulic force acting on the control sleeve 34 equals the opposing gear thrust force. Since the same regulated pressure is also acting on the clutch apply piston 28, the torque capacity of the clutch also changes in direct proportion to the gear thrust force and to the torque being transmitted.

Consequently, at the end of the torque phase the torque in the off-coming clutch 20 diminishes to zero, the pressure in chamber 36 correspondingly decreases to a near-zero value resulting in an automatic, self-timed release of the clutch at the precisely right moment as band 130 fully engages to hold the sun gear 81 of gear set 80 for reaction. Any slight drag still present between the plates of the multi-mode clutch will be totally eliminated when the feed to the clutch is blocked upon completion of the shift. This takes place when the solenoid 165 controlling the feed control valve 152 is energized to shift the valve element in valve 154 and the piston chamber 36 becomes fully exhausted.

For automatic self synchronized power shifts from third to fourth gear for overdrive, the multi-mode clutch 20 is conditioned for a one-way operating mode. In fourth gear the power from the engine is transmitted through the third/fourth clutch 60, which connects the ring gear 72 of the input gear set 70 and the carrier 84 of the reaction gear set 80 to the input shaft 14. When the band 130 is applied to hold the sun gear 81 of the gear set 80, the ring gear 82 and the output shaft 76 connected thereto start turning faster than the input for overdrive. The carrier 74 running at output shaft speed and turning faster than the ring gear 72 causes the sun gear 71 and the clutch friction plates 25 of the multi-mode clutch connected thereto to overspeed the clutch friction plates 24 splined to the clutch housing 22 and running at input shaft speed. This reversal of the sense of relative rotation automatically releases the off-coming multi-mode clutch, which now starts freewheeling.

At the 4–3 downshift signal, the multi-mode forward clutch 20 is immediately staged for a one-way mode. This is done (1) by de-energizing the feed control valve solenoid 165, which opens the fluid pressure feed passage 162 to the clutch chamber 36, and (2) by simultaneously energizing the exhaust control valve solenoid 165, which connects the exhaust port 38 with the ball regulating valve 164. Pressure introduced in chamber 36 will force the control sleeve 34 forward leaving the exhaust port 38 fully open. The resulting tickling pressure urging piston 28 against the clutch pack of interleaved friction plates 24, 25 and backing plate 26 causes some light torque to be transmitted from the input shaft 14 to the input gear set 70. Due to its helical tooth form, the sun gear 71 slides forward away from the control sleeve 34.

When the descending capacity of the off-coming band 130 reaches a point where the band starts slipping, the ring gear 72 of the input gear set 70 being clutched onto the input shaft 14 will start speeding up and the sun gear 71 will start slowing down. At the point where the direction of relative speed between the input shaft 14 and the sun gear 71 is reversed, the direction of torque transmitted by the gear set 70 is also reversed. The sun gear 71 then starts to slide in the opposite direction and toward the control sleeve 34. Sleeve 34 is resultantly axially displaced until it closes the exhaust port 38 causing a rapid pressure rise in chamber 36. The multi-mode forward clutch 20 is accordingly locked up instantaneously so that the transmission is down-shifted for the third gear operation.

The gear thrust actuated multi-mode clutch of this invention can be readily employed with countershaft-type transmissions. This clutch is substantially the same as the previously described multi-mode clutch for the transmission of FIG. 1.

The power downshift operation is functionally identical to a downshift employing a roller or sprag-type one-way clutch.

Figure 3:
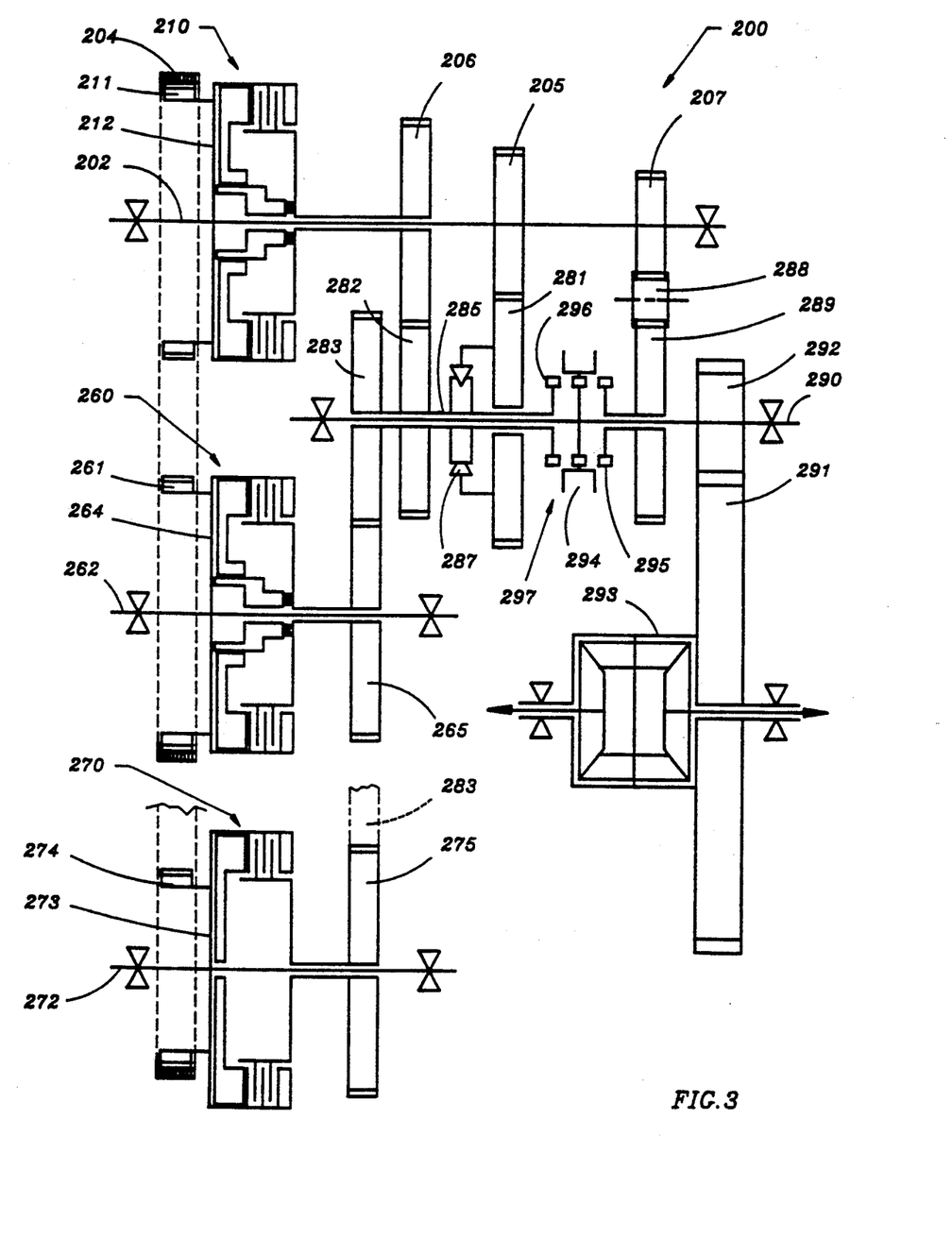
FIG. 3 is a diagrammatic view of a multi-axis transmission.

More particularly, the multi-mode clutch of this invention can be employed with a conventional countershaft-type transmission or with the countershaft-type transmission, as shown schematically in FIG. 3. The transmission of FIG. 3 identified by reference numeral 200 presents a unique and extremely compact arrangement of such countershaft or parallel axis transmissions. This transmission has four forward gear ratios or ranges and a reverse gear. This invention is effectively used to provide smooth freewheeler type shifts for all ratio range changes.

This transmission has a plurality of pairs of meshing helical gears producing axial thrust under load and each operating parallel to one another providing a vehicle with a desired number of forward drive ratios and a reverse drive ratio, as in most conventional manual and some automatic transmissions as well. To gain compactness and reduced axial length, the driving gears are rotatably mounted on plurality of chain driven drive shafts and can be selectively locked to the said shafts by operation of the gear thrust biased multi-mode clutch of this invention. A single multi-mode clutch will do the work of two multiple plate clutches and freewheeler of prior transmission designs.

The transmission 200, shown in FIG. 3, has an input shaft 202 connected to a power source through a hydrodynamic torque converter, a fluid coupling or main clutch, not shown. Secured on the input shaft 202 are two spaced helical gears 205 and 207, which are the input drive gears for the first and reverse ratio drive ranges respectively, and a housing 212 for a multi-mode second clutch 210. When drivingly engaged, this clutch provides a power path that connects to a second drive gear 206, which is rotatably and slidably mounted on the input shaft 202. A chain drive sprocket 211 is either an integral part of the second clutch housing or securely attached to it.

An annular multi-mode clutch housing 264 attached to an auxiliary drive shaft 262 provides a housing for a third gear multi-mode clutch 260. This clutch provides a power path that connects a third range drive gear 265, which is rotatably and slidably mounted on the drive shaft 262 that has the clutch housing 264 and a chain drive sprocket 261 attached to it.

The fourth ratio drive gear 275 is rotatably mounted on an auxiliary shaft 272 parallel to the main drive shaft which also has a clutch housing 273 is secured thereto. This clutch housing is a part of a conventional multiple plate clutch 270, which connects the drive gear 275 with the clutch housing 273. Drive gear 275 meshes with gear 283 as will be explained hereinafter. The housing has a chain drive sprocket 274 fixed thereto to provide an input to establish the fourth gear drive ratio.

A chain 204 wraps around the three co-planar drive sprockets 211, 261 and 274 and provides the mechanism for driving the two auxiliary parallel shafts 262 and 272 from the input shaft 202 in the third and fourth ratio ranges. Optionally, the sprockets 261 and 274 may be also driven by two individual chains, which may provide a quieter drive and while not taking any more axial space could provide other advantages from a packaging point of view.

The first range driven gear 281 meshing with drive gear 205 is mounted rotatably on an annular sleeve shaft 285 which in turn is mounted rotatably on an output shaft 290. A conventional one-way roller or sprag clutch 287 is disposed between the gear 281 and sleeve shaft 285. This allows an automatic lock up when the gear 281 turns in a forward drive direction and allows freewheeling when the gear 281 wants to turn slower than the sleeve shaft 285.

Two other helical toothed gears 282 and 283 are also secured to the sleeve shaft 285. Gear 282 meshes with the second range drive gear 206, and the gear 283 meshing with both the third ratio drive gear 265 and the fourth ratio drive gear 275.

Output shaft 290 terminates in a final drive pinion 292 that meshes with a final drive ring gear 291 fastened to a conventional differential 293.

The overall fourth range ratio differs from the ratio in third range by the virtue of fourth gear driven sprocket having a smaller pitch diameter than the third gear sprocket.

The reverse drive gear 207 of FIG. 3 is attached to the input shaft 202, and meshes with an idler gear 288, which in turn meshes with a driven gear 289 so that it turns in a direction opposite to the direction of the other driven gears 281 and 282 rotatably mounted on the output shaft 290. A conventional dog clutch 297 with a shifter 294 slidably secured to the output shaft 290 is operatively interdisposed between a splined flange 295 at the end of a sleeve shaft extending from the driven reverse gear 289 and a splined flange 296 at the end of the sleeve shaft 285. The transmission is set in neutral by placing the dog clutch shifter sleeve 294 in its middle position. For selecting forward or reverse, the operating range shifter 294 is moved axially from its center position to engage with either of the two adjacent splined flanges 295 and 296 utilizing a manual shift lever or other suitable shift mechanism, not shown.

Figure 4:
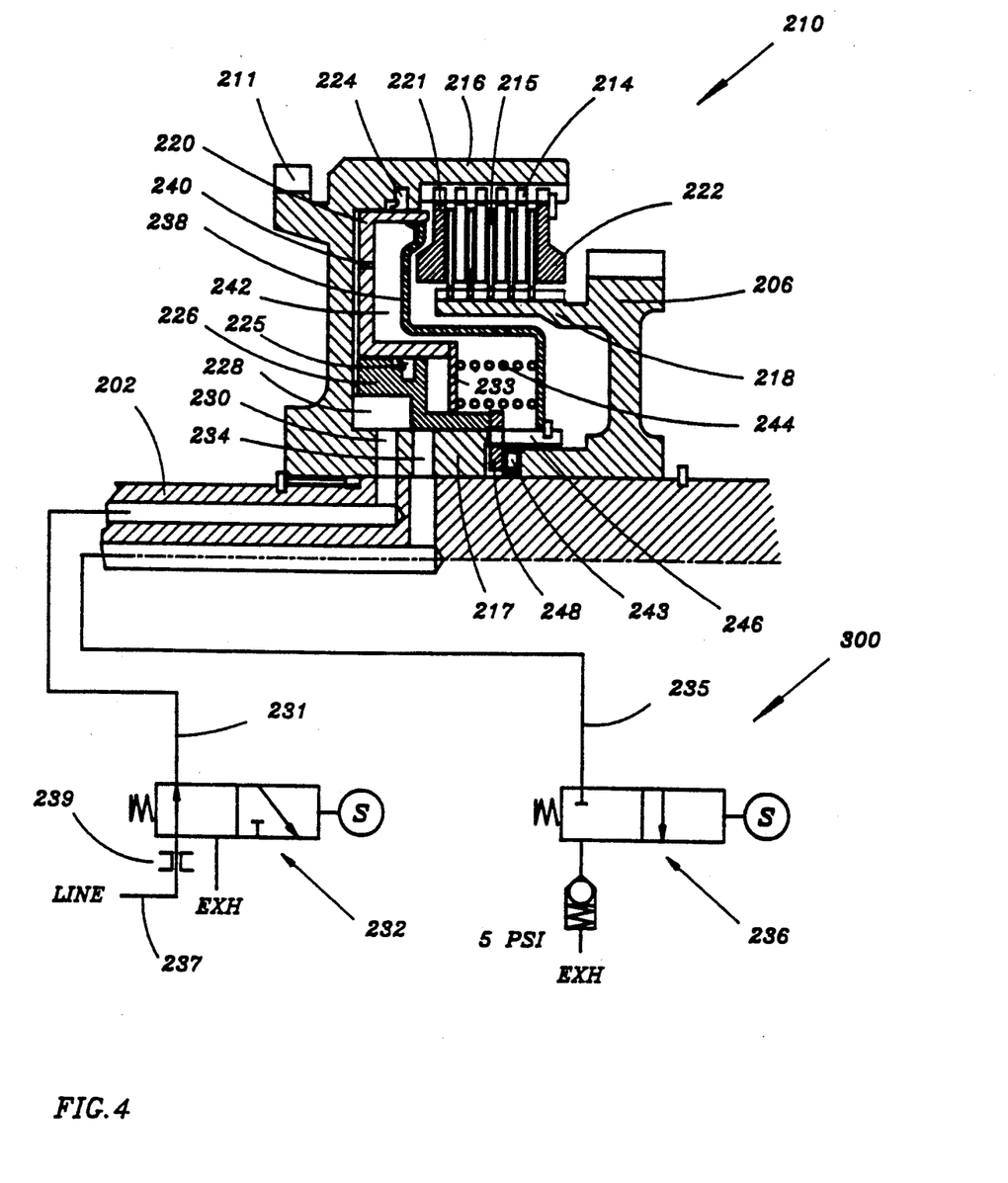
FIG. 4 is a sectional view of a portion of the transmission of FIG. 3 enlarged to show details thereof and having control valves diagrammatically associated therewith.

The construction of a gear thrust biased multi-mode clutch is shown in greater detail in FIG. 4. Because of the similarity between clutches 210 and 260 only the second gear clutch 210 is described in detail.

Referring to FIG. 4, the second ratio drive gear 206 is rotatable and slidably mounted on the output shaft 202. Friction plates 215 are splined at the inner periphery to the axially extending cylindrical portion of the clutch housing 216, which in turn is splined to the output shaft 202. Friction plates 214 are interleaved with friction plates 215, which are splined at their inner diameters to the outer periphery of a cylindrical hub 218 extending axially from the second ratio drive gear 206. The multi-mode second clutch is selectively engaged by a piston 220 through an apply plate, which is slidably disposed in housing 216 and is backed up by a reaction or backing plate 222.

Also housed in clutch housing 216 is an annular control sleeve 226, slidably disposed between the inner diameter of piston 220 and the outer diameter of clutch hub 217. Piston 220 is sealed by a lip seal 224 at its outer diameter and by a lip seal 225 at the interface between the piston and the control sleeve 226. A pressure chamber 228, formed by an end wall of housing 216, piston 220 and the control sleeve 226, has a feed port 230, which communicates with a feed control valve 232 through passage 231, and an exhaust port 234, which communicates with an exhaust control valve 236 through passage 235.

The multi-mode clutch 210 is applied by pressurizing chamber 228 from the oil supply line 237 through the orifice 239 and the line feed control valve 232, which causes the piston 220 to exert an apply force on the clutch pack formed by the interleaved friction plates through an apply plate 221 splined to the clutch housing 216. The backing plate 222 splined to the clutch housing 216 provides a reaction surface against the apply force.

A balance piston 238 is provided to prevent an unintentional apply of the clutch at high rotational speeds, as has been discussed earlier while describing the multi-mode clutch construction shown in FIG. 2. Chamber 242 formed between piston 220 and the balance piston 238 is kept full of oil by a continuous flow through a bleed orifice 240 in piston 220.

Compression springs 244, disposed between plate 233 abutting the apply piston 220 and the balance piston 238 retracts the apply piston when the clutch is released.

Balance piston 238 is retained on a slotted cylindrical extension 246 to the clutch housing hub 217 by a snap ring. A thrust plate 248 provided for transmitting the axial gear force to the control sleeve 226 has openings permitting projections formed by slotting the hub extension 246 penetrate through the plate 248.

A needle thrust bearing 243 is disposed between the thrust plate 248 and the hub portion of gear 206 to accommodate for a speed difference that exist between these two components when the clutch is disengaged.

For apply, the gear thrust biased multi-mode clutch is set in a lock mode by blocking the flow through the exhaust control valve 236. When torque is transmitted through the helical gears 282 and 206, the driven gear 206 moves leftward thrusting on the control sleeve through the needle bearing 243 and the thrust plate 248. An annular control sleeve 226 mounted on clutch hub 217 resultantly slides left to close the exhaust port 234 and the chamber 228 becomes charged with feed line pressure. This effects the drive engagement of the multi-mode clutch 210. In the lock mode, the clutch 210 remains engaged both in drive and in coast operation. In second, the chain rotatably drives clutch housing 216, inputting gears 206, 282 for second ratio power flow through the output shaft 290 to the final drive gearing 292, 291 and to the differential 293.

On the first range to second range upshift signal, the multi-mode second clutch 210 is immediately set in the normal locked mode by de-energizing the solenoids operating feed and exhaust control valves 232 and 236, as shown in the controls diagram 300 of FIG. 4. In this mode the multi-mode clutch functions like a conventional clutch. As the torque of the on-coming clutch increases, the torque carried by the one-way clutch 287 decreases. After this torque reaches zero, the one-way clutching device overruns for the speed change phase of the 114 2 ratio shift.

For upshifting from the second to third gear, the multi-mode second clutch 210 is set in the one-way mode and the multi-mode third clutch 260 in the lock mode. When the third clutch 260 is applied, and as the torque transmitted by this clutch increases, the torque carried by the off-coming second clutch 210 and the helical gear 206 decreases. The resulting axial gear force component is also reduced, and at the point where the hydraulic force acting on the control sleeve 226 overcomes the thrust force of the helical gears 206 and 282, the control sleeve resultantly starts sliding rightward uncovering the exhaust port 234. This drops the chamber pressure until the gear thrust and hydraulic forces acting on the control sleeve are in equilibrium. Pressure in the chamber 228 continues to fall in proportion to the diminishing torque transmitted by the multi-mode second clutch. At the end of the torque phase, as the torque carried helical gear 206 reaches zero, the axial gear force also equals zero. The piston chamber 228 becomes exhausted and the clutch 210 disengages so that all torque is transmitted by the third clutch 260.

After the shift is complete, the feed of pressure fluid to the piston chamber 228 of the second range clutch is blocked at the feed control valve 232 and the clutch is fully released.

The 3-2 downshift in a parallel axis transmission corresponds to a downshift in a transmission with the planetary 3-2 downshift gearing described in connection with FIGS. 1 and 2. Immediately upon the shift signal, the on-coming lower gear associated clutch is set in one-way mode.

The presence of the tickling pressure in the piston chamber establishes a light clutch drag torque, which is also transmitted by the helical gear 206 causing it to move rightward, away from the control sleeve 226. As the third gear clutch 260 releases enough to start slipping, the input shaft 202, clutch housing 216 and the clutch plates 214 splined to the clutch housing 216 accelerate reaching the speed of the helical gear 206. At that moment the negative drag torque becomes the initial torque needed to automatically engage the clutch. This happens as the axial thrust, acting in an opposite direction, pushes on the control sleeve 226. The leftwardly sliding control sleeve covering more of the exhaust port 234 reduces the outflow, which increases both the pressure in the piston chamber 228 and the capacity of the clutch. With a torque capacity always self-regulated to be higher than the torque that is carried, the on-coming clutch locks up instantaneously at torque reversal, just like a conventional roller or sprag clutch.

There is also another favorable difference in the multi-mode clutch over a one-way roller or sprag clutch. When the on-coming clutch locks up during a power downshift, the resultant torque peak is determined by the elastic stiffness of the system. All other factors being the same, the hydraulically applied clutch with its resilient clutch plates of a multi-mode clutch should produce smoother shifts, or at least eliminates the "clunk" or other noises sometimes experienced with roller and sprag clutches in such situations.

While preferred embodiments of the invention have been shown and described, other embodiments will now become apparent to those skilled in the art. Accordingly, this invention is not to be limited to that which is shown and described but by the following claims.

What is claimed is:

1. A multi-mode friction drive establishing device for a transmission having torque input and output means and gear means operable to provide a plurality of forward drive gear ratios and a reverse ratio comprising,
   a housing,
   first friction means operatively connected to said housing,
   a support,
   second friction means operatively mounted on said support and associated with said first friction means and engagable therewith to define a friction device to transmit torque,
   piston means operatively mounted in said housing to define a chamber therein for receiving pressurized fluid and being operative to effect frictional engagement of said first and second friction means so as to transmit torque,
   gear set means operatively connected with said support having helical gear means which produces a variable thrust force from the torque transmitting device,
   fluid pressure control means for selectively supplying pressure fluid to said chamber to effect the frictional engagement of said first and second friction means by said piston means for the drive of said gear set means,
   exhaust means being selectively conditionable for exhausting fluid pressure from said chamber for effecting the frictional release of said first and second friction means,
   control means associated with said exhaust means and movable in response to opposing gear thrust and fluid pressure forces exerted thereon by said helical gear means and said pressure fluid in said chamber to effect the regulation of fluid pressure in said chamber which decreases as the torque transmitted by said gear set means decreases and increases as the torque transmitted by said gear set means increases.

2. The multi-mode friction drive establishing device of claim 1, wherein said gear set means forms part of the gear means of the transmission and is operable by engagement of said multi-mode friction drive establishing device to provide at least one of the gear ratios of the transmission, additional gear set means operatively connected between said gear set means and the output of said transmission and operable to provide a higher gear ratio than said one of the gear ratios, a high ratio friction drive establishing device associated with said additional gear set means and being operable for establishing said higher gear ratio, said control means being a control sleeve means associated with said exhaust means for regulating the pressure in said multi-mode friction drive establishing device so that when during an upshift of said drive gear ratios said higher ratio establishing device has gained sufficient capacity to carry the input torque and the torque transmitted by said multi-mode friction drive establishing device and the associated gearing reduces to zero, the said multi-mode friction drive establishing device capacity correspondingly diminishes to a low value including zero and said lower ratio establishing clutch becomes disengaged and starts freewheeling.

3. The multi-mode friction drive establishing device of claim 2, wherein said exhaust means includes an exhaust control valve having an exhaust passage means therein and pressure regulating means associated with said exhaust control valve for regulating a low tickling pressure engagement bias in said chamber to produce a low drag torque between said first and second friction means required for the self timed apply and release of said multi-mode friction drive establishing device.

4. The multi-mode friction drive establishing device of claim 2, wherein said exhaust means includes an exhaust port in said housing and said control sleeve is slidably mounted in said housing to control the opening of said exhaust port and the increasing pressure in said chambers to effect a smooth and self-timed downshift from said frictionally engaged high ratio friction drive establishing device to said multi-mode clutch, wherein said fluid pressure control means for supplying a pressure fluid to said chamber includes a restricted fluid feed passage and a control valve hydraulically connected to said chamber, said exhaust means further includes an exhaust control valve hydraulically connected to said exhaust port having regulating means for regulating a low pressure in said chamber for effecting a minimized low bias of said friction device for the transmittal of low torque to said gear set means, said gear set means resultantly exerting a low thrust force which before the speed change phase of the shift is directed away from said control sleeve to fully open said exhaust port to said low pressure regulating means and when said high ratio friction drive establishing device is released sufficiently to commence the speed change phase of the shift, said thrust force is reversed in direction to act on said control sleeve means so that it closes said exhaust port causing a rapid rise in the pressure present in said chamber so that the multi-mode clutch is instantaneously locked up.

5. The multi-mode friction drive establishing device of claim 2, wherein said gear set means is an input planetary gear set adapted to be driven by said torque input means and said additional gear set means is a reaction planetary gear set, drivingly connected to said torque output means.

6. The multi-mode friction drive establishing device of claim 2, wherein said gear set means is defined by a pair of meshing helical gears of a lay shaft transmission including a drive gear adapted to be driven by said multi-mode clutch and a driven gear adapted to be connected to said torque output means.

7. The multi-mode friction drive establishing device of claim 2, wherein said gear set means of the transmission is an input planetary gear set and said additional gear set means is a reaction planetary gear set for said transmission, said input planetary gear set having a sun gear associated with said control means and having planet gears operatively mounted on a carrier connected to said torque output means and further having a ring gear operatively connected to said carrier of said reaction planetary gear set, said multi-mode friction drive establishing device being operable firstly, during an upshift, to decrease its torque capacity as the torque transmitted by said high ratio friction drive increases, and to release said clutch fully at the end of said upshift, and secondly, during a downshift, regulate its capacity to exceed the increasing torque carried by said multi-mode clutch when the torque of said higher ratio friction device diminishes down to zero.

8. The multi-mode friction drive establishing device of claim 7, wherein said exhaust means includes an exhaust port in said housing and wherein said control sleeve is a generally cylindrical member having a fluid pressure surface at one end thereof and having gear thrust receiving means at the other end thereof, said control sleeve being axially movable in a first direction by the thrust forces of said helical sun gear to effect the closure of said exhaust port to progressively increase the torque capacity of the multi-mode friction drive establishing device, and axially movable in second and opposite direction to effect the opening of said exhaust port to reduce the pressure in said piston chamber and thereby the torque capacity of said multi-mode friction drive establishing device.

9. The multi-mode friction drive establishing device of claim 1 in which the torque input means is driven by the output of an internal combustion engine powering a vehicle through the transmission and wherein said exhaust means can be completely blocked thereby effecting the charging of said chamber with said pressure fluid to cause said multi-mode friction device to enter into a lock up mode in which said device is engaged in the manner of a conventional hydraulically applied multi-plate clutch for smooth engagement of said first and second friction means and for providing engine braking when the vehicle is coasting.

10. In combination with a countershaft transmission having drive torque input means for selectively driving any of a plurality of stepped drive gear ratios and having torque output means driven by any of said stepped drive gear ratios, separate multi-mode clutch means associated with each of said stepped drive gear ratios selectively operable for establishing separate power paths through said drive gear ratios to said transmission output means, each of said multi-mode clutch means having a rotatable housing and clutch housing drive means operatively connected to said drive torque input means so that said clutch housings can be driven thereby, each of said clutch housings having first friction plate means operatively connected to said associated housing and second friction plate means associated with said first friction means, a separate support means for supporting said second friction plate means of each of said multi-mode clutch means and forming the output thereof, each of said drive gear ratios being defined by a separate helical gear set associated with each of said multi-mode clutch means, each of said gear sets having an input helical gear adapted to be driven by the output of an associated one of said clutches when frictionally engaged and having an output helical gear for driving a torque transmitting shaft means adapted to be operatively connected to said output means of said transmission,

- each of said housings having piston means operatively mounted therein to define a fluid pressure chamber for receiving pressurized fluid for the frictional engagement of said first and second friction plate means,
- fluid pressure supply means for selectively supplying fluid pressure to said chamber to effect the frictional engagement of said first and second friction plate means by said piston means for the drive of said associated helical gear set means,
- exhaust means associated with each of said chambers selectively conditionable for exhausting fluid pressure from said chamber, and
- control means for said exhaust means and movable in response to the opposing forces of helical output gear thrust and the apply pressure in said chamber to regulate the fluid pressure in said chamber which decreases as the torque transmitted by said associated gear set decreases and increases as the torque transmitted by said associated gear set increases so that an automatic upshift transition between said stepped drive ratios occurs when said higher ratio establishing device has gained sufficient capacity to carry the input torque and the lower ratio establishing device experiences a reduction in torque capacity in accordance to the diminishing torque it carries until the clutch completely releases when such torque reduces to zero.

11. The combination of claim 10, wherein said helical input gear adapted to be driven by one of said multi-mode clutches is mounted for rotation about said first longitudinal axis of said drive shaft means and wherein said output helical gear of said one clutch is mounted for rotation on said sleeve shaft means for selectively connecting said sleeve shaft with said output shaft.

12. The combination of claim 11, wherein said input helical gear of another one of said multi-mode clutches is mounted for rotation about the longitudinal axis of a third shaft parallel the first and second shafts and wherein said output gear of said another multi-mode clutch is mounted on said sleeve shaft for selective connection to said output shaft.

13. The combination of claim 11, and further including another clutch with a housing rotatably driven by said chain about the axis of an auxiliary shaft parallel to said first, second and third shafts, said another clutch housing having ak sprocket drive gear driven by said chain means, said last mentioned sprocket drive gear having a pitch diameter less than the pitch diameter less than the pitch diameters of said other drive sprocket gears so that it will be driven by said claim drive means faster than said other drive sprocket gear to establish the top ratio drive of said transmission, said last mentioned clutch means being adapted to drive a helical gear set, said helical gear set including a helical gear meshing with the output helical gear of said another of said clutch means.

14. The combination of claim 10, wherein each of said housing drive means comprises annular externally toothed sprocket gear means secured thereof, said toothed sprocket gear means being disposed in a common plane, drive shaft means extending along a first longitudinal axis for driving one of said clutch, housing and continuous drive chain means extending in said common plate and drivingly connected to each of said sprocket gear means, and an output shaft parallel to said input shaft and a sleeve shaft disposed about said output shaft.

15. The transmission of claim 14 above, wherein said second and third associated gears are helical gears and provide thrust forces when under load to control the exhaust of clutch apply pressure from said apply chamber to effect automatic 2-3 upshifts and 3-2 downshifts in a manner simulating automatic shifts of a one-way roller clutch.

16. In a transmission, input means for inputting torque into said transmission, a plurality of selectively engagable clutches, each of said clutches having a rotatable housing, drive means connected to said input means for driving each of said clutch housings, each of said clutches having an output, a torque transmitting shaft adapted to be driven by said gear set when said associated clutches are selectively engaged, each of said clutches having first friction plate means operatively connected to said rotatable housing, each of said outputs having second friction means associated with said first friction means, an output means for said transmission,

- first gear set means including a first gear driven by said input means and an associated gear driven by said first gear for establishing a first gear ratio for said transmission,
- second gear set means having a second gear driven by said output of one of said clutches and an associated gear adapted to be connected to said output shaft to establish a second ratio for said transmission,
- third gear set means having a third gear driving by the output of said another of clutch means and an associated gear driven by the third gear and adapted to drive the output of said transmission,
- fourth gear set means having a fourth gear adapted to be driven by the output of said yet another clutch means,
- said fourth gear meshingly engaged with the associated gear of said third gear set means and being adapted to drive said third associated gear to establish the fourth forward gear ratio of said transmission.

17. The transmission of claim 16 above, wherein each of said clutch housings has sprocket means associated therewith, and wherein said input of said transmission comprises an input shaft and chain means drivingly connected said sprocket means so that said clutch housings are rotatably driven by said input shaft and said chain means.

18. The transmission of claim 17 above, wherein each of said sprocket means is integral with an associated clutch housing.

19. In a transmission, input means for inputting torque into said transmission, a plurality of clutches, each of said clutches having a rotatable housing, drive means connected to said input means for rotatably driving each of said clutch housings, each of said clutches having an output drum and having first friction plate means operatively connected to said rotatable housing, each of said outputs drums having second friction means associated with said first friction plate means, an output means for said transmission,     first gear set means including a first gear driven by said input means and an associated gear driven by said first gear for establishing a first gear ratio for said transmission,     second gear set means having a second gear with helical teeth driven by said output of a second gear ratio drive clutch and an associated gear with helical teeth meshing with the helical teeth of said second gear and adapted to be connected to said output means of said transmission to establish a second gear ratio for said transmission,     said housing of at least one of said clutches having hydraulically actuated piston means operatively mounted therein defining a fluid pressure chamber therein, said piston means being adapted for movement between a first position in which said friction plates are frictionally separated so that they can relatively rotate without transferring appreciable drive torque and a second position in which said friction plates are frictionally engaged so as to transfer appreciable drive torque, means for supplying said fluid chamber with a pressure fluid to effect the movement of said piston to an apply position, means defining an exhaust port for exhausting fluid from said chamber to effect the release of said friction plates by said piston, control sleeve means having a pressure surface within said chamber so that hydraulic pressure fed to said chamber can exert a force in a first direction to move said sleeve to effect the opening of said exhaust port so that said clutch is released for shifting said transmission, said control sleeve having a second pressure surface for receiving the thrust load of said helical gears to urge said control sleeve in a direction opposite to said first direction to close said exhaust port to allow said pressure to building said chamber to effect the movement of said piston to said second position whereby said clutch is frictionally engaged for shifting said transmission.

\* \* \* \* \*